(12) United States Patent
Lin

(10) Patent No.: US 8,657,611 B1
(45) Date of Patent: Feb. 25, 2014

(54) CARD CONNECTOR

(75) Inventor: Chih-Chiang Lin, New Taipei (TW)

(73) Assignee: Proconn Technology Co., Ltd., New Taipei (TW)

( * ) Notice: Subject to any disclaimer, the term of this patent is extended or adjusted under 35 U.S.C. 154(b) by 29 days.

(21) Appl. No.: 13/609,934

(22) Filed: Sep. 11, 2012

(51) Int. Cl.
*H01R 13/62* (2006.01)

(52) U.S. Cl.
USPC ........................................................ 439/159

(58) Field of Classification Search
USPC .................................................. 439/159, 630
See application file for complete search history.

(56) References Cited

U.S. PATENT DOCUMENTS

| | | | |
|---|---|---|---|
| 6,890,195 B2 * | 5/2005 | Nagata ........................... | 439/159 |
| 7,267,565 B2 * | 9/2007 | Hsu et al. ....................... | 439/159 |
| 7,322,838 B1 * | 1/2008 | Chen et al. ..................... | 439/159 |
| 7,393,221 B2 * | 7/2008 | Feng et al. ..................... | 439/159 |
| 2001/0012712 A1 * | 8/2001 | Nishioka ........................ | 439/159 |
| 2007/0004257 A1 * | 1/2007 | Hsu et al. ....................... | 439/159 |
| 2013/0005168 A1 * | 1/2013 | Ye et al. ......................... | 439/159 |

* cited by examiner

*Primary Examiner* — Gary Paumen
(74) *Attorney, Agent, or Firm* — WPAT, P.C.; Anthony King

(57) ABSTRACT

A card connector includes an insulating housing defining a receiving chamber for receiving a card, a plurality of terminals disposed in the insulating housing, an ejecting device disposed in one side of the receiving chamber, and a cover coupled on the insulating housing. The ejecting device includes a sliding body of which a top defines a sliding fillister, and a spring restrained between a rear sidewall of the receiving chamber and the sliding body. A bottom sidewall of the sliding fillister protrudes upward to form a blocking block designating a front face thereof as a blocking face. The cover has a top plate of which one side is die-cut to form an elastic slice inclined downward into the sliding fillister. The elastic slice resists against the blocking face in use to keep the sliding body being locked, and sets free the blocking block when ejecting the card out.

12 Claims, 4 Drawing Sheets

CARD CONNECTOR

BACKGROUND OF THE INVENTION

1. Field of the Invention

The present invention generally relates to a card connector for receiving a card therein, and more particularly to a card connector capable of preventing the card from being ejected out in use.

2. The Related Art

Traditionally, a card connector adapted for being soldered on a circuit board and receiving a card therein has an ejecting device used for withdrawing the card from the card connector. The ejecting device includes a sliding body, a spring and a connecting bar. While the card is inserted into the card connector, the card pushes the sliding body to move. Then the spring is compressed and the connecting bar jostles the sliding body to keep the sliding body and the spring relatively immovable. While the card will be withdrawn from the card connector, the card is again pushed inward to make the sliding body discharged from the connecting bar. And the power stored in the spring is released so as to drive the spring to reposition and further drive the sliding body to reposition. So the sliding body pushes the card to exit from the card connector.

However, in use, if the card is accidentally pushed inward by an external force, the card connector easily springs the card out through the released power from the spring. As a result, the communication of the card and the circuit board is undeservedly interrupted and the data which is being transmitted is easily lost. So, a card connector capable of preventing the card from being ejected out in use is required.

SUMMARY OF THE INVENTION

An object of the present invention is to provide a card connector adapted for being mounted on a circuit board and receiving an external card. The card connector includes an insulating housing defining a receiving chamber for receiving the card therein and a sliding recess adjacent to one side of the receiving chamber, a plurality of terminals disposed in the insulating housing for electrically connecting the card and the circuit board, an ejecting device disposed in the sliding recess of the insulating housing, and a cover coupled on the insulating housing. The ejecting device includes a sliding body and a spring restrained between a rear sidewall of the sliding recess and the sliding body. A pushing arm is formed at a rear end of the sliding body and protrudes sideward into the receiving chamber. A top face of the sliding body defines a sliding fillister. A bottom sidewall of the sliding fillister protrudes upward to form a blocking block spaced from a front sidewall of the sliding fillister and designating a front face thereof as a blocking face. The cover has a top plate of which one side is die-cut to form an elastic slice inclined downward into the sliding fillister and elastically against a top of the blocking block.

In the process of the card being inserted into the receiving chamber of the card connector and pushing the sliding body to move rearward via resisting against the pushing arm, the elastic slice of the cover is elastically propped upward by the blocking block and slides forward with respect to the blocking block. When the card is inserted in place, the elastic slice slips off from the blocking block to resist against the blocking face. When the card needs to be withdrawn from the card connector, the elastic slice of the cover is driven upward by an external force to set free the blocking block and the spring so as to push the card out.

As described above, the elastic slice of the cover can resist against the blocking face of the sliding body in use, and set free the blocking block when ejecting the card out. So, in use, the sliding body keeps being locked by the elastic slice so that ensures a steady connection between the card and the circuit board.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
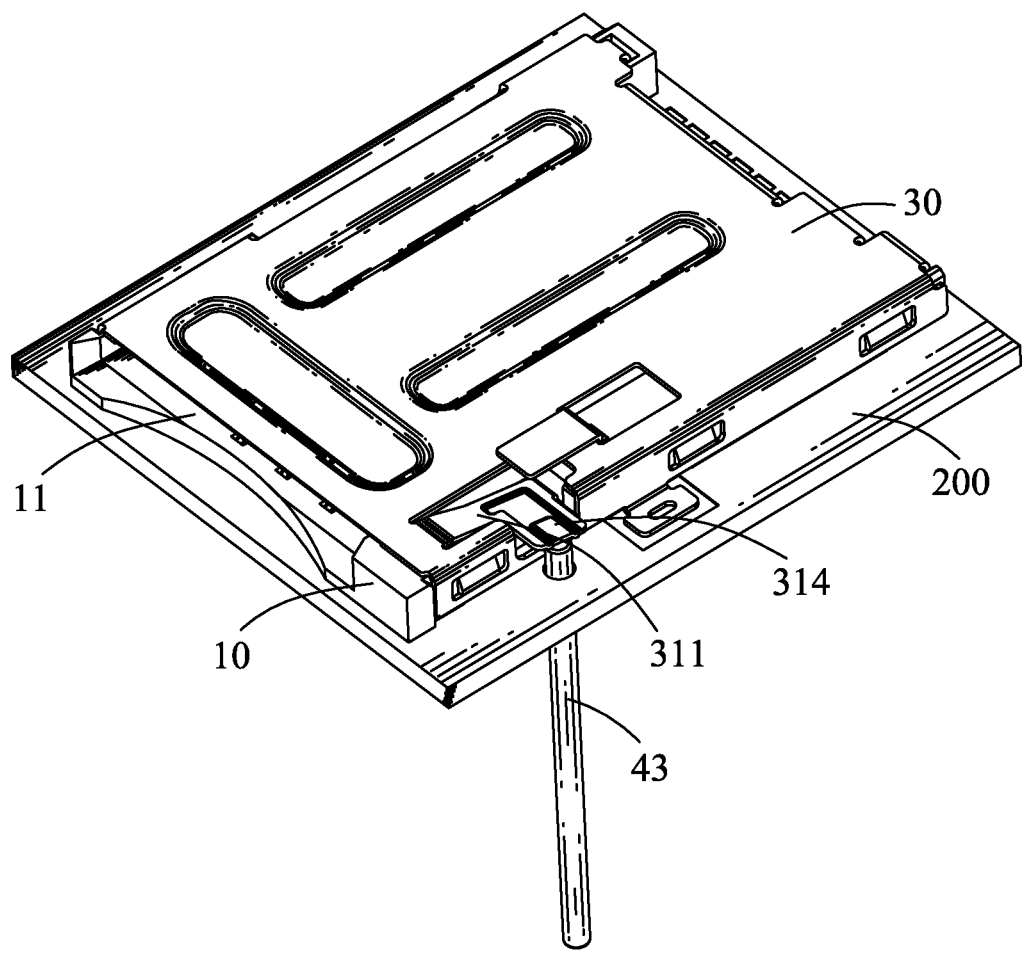
FIG. 1 is a perspective view of a card connector mounted on a circuit board according to an embodiment of the present invention.

Referring to FIGS. 1-6, a card connector 100 according to an embodiment of the present invention is adapted for being mounted on a circuit board 200 and receiving an external card 300. The card connector 100 includes an insulating housing 10, a plurality of terminals 20, an ejecting device and a cover 30.

The insulating housing 10 defines a receiving chamber 11 for receiving the card 300 therein, and a sliding recess 12 adjacent to one side of the receiving chamber 11. The terminals 20 are disposed in the insulating housing 10 for electrically connecting the card 300 and the circuit board 200. The ejecting device is disposed in the sliding recess 12 of the insulating housing 10. The ejecting device includes a sliding body 41 and a spring 42 restrained between a rear sidewall of the sliding recess 12 and the sliding body 41. A pushing arm 411 is formed at a rear end of the sliding body 41 and protrudes sideward into the receiving chamber 11. A top face of the sliding body 41 defines a sliding fillister 412. A bottom sidewall of the sliding fillister 412 protrudes upward to form a blocking block 413 spaced from a front sidewall of the sliding fillister 412 and designating a front face thereof as a blocking face 414. The cover 30 is coupled on the insulating housing 10. The cover 30 has a top plate 31 of which one side is die-cut to form an elastic slice 311 inclined downward into the sliding fillister 412 and elastically against a top of the blocking block 413.

In the process of the card 300 being inserted into the receiving chamber 11 of the card connector 100 and pushing the sliding body 41 to move rearward via resisting against the pushing arm 411, the elastic slice 311 of the cover 30 is elastically propped upward by the blocking block 413 and slides forward with respect to the blocking block 413. When the card 300 is inserted in place in the card connector 100, the elastic slice 311 slips off from the blocking block 413 to resist against the blocking face 414. When the card 300 needs to be withdrawn from the card connector 100, the elastic slice 311 of the cover 30 is driven upward by an external force to set free the blocking block 413 and the spring 42 so as to push the card 300 out.

Referring to FIGS. 2-6, the elastic slice 311 of the cover 30 extends rearward and is inclined downward in the process of extending rearward. A free end of the elastic slice 311 protrudes downward to form a sliding block 312. The top of the blocking block 413 is designed as a slope 413a substantially parallel to the elastic slice 311. In the process of inserting the card 300 into the receiving chamber 11, the sliding block 312 relatively slides forward along the slope 413a of the blocking block 413 and the elastic slice 311 is gradually propped upward by the slope 413a. A transition surface 415 is levelly connected between a front end of the slope 413a and a top end of the blocking face 414 of the blocking block 413 for buffering the elastic slice 311 before it slips off from the blocking block 413.

Figure 2:
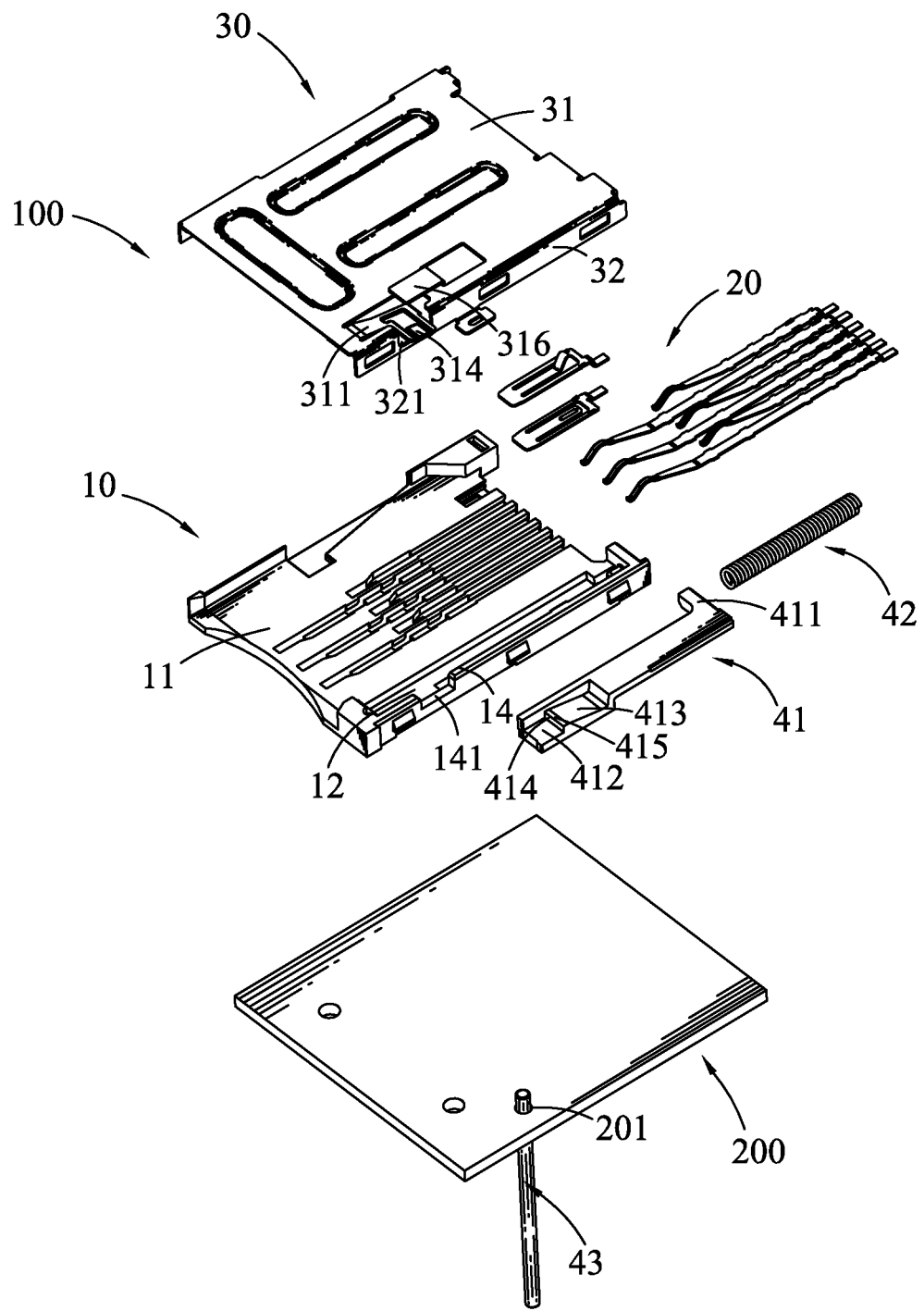
FIG. 2 is an exploded view of the card connector and the circuit board of FIG. 1.
Figure 4:
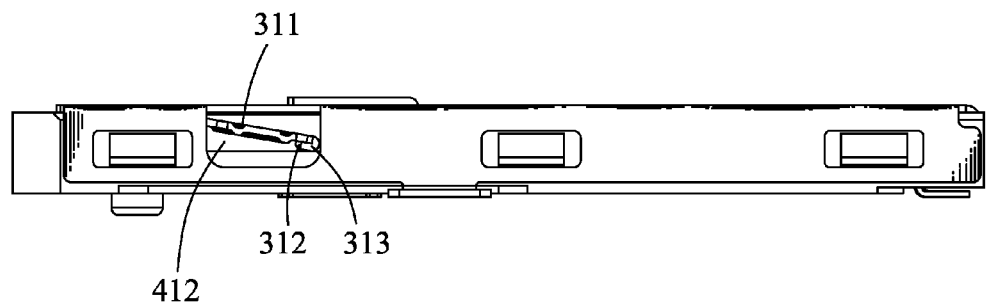
FIG. 4 is a lateral view showing the card connector of FIG. 1 is in use.
Figure 5:
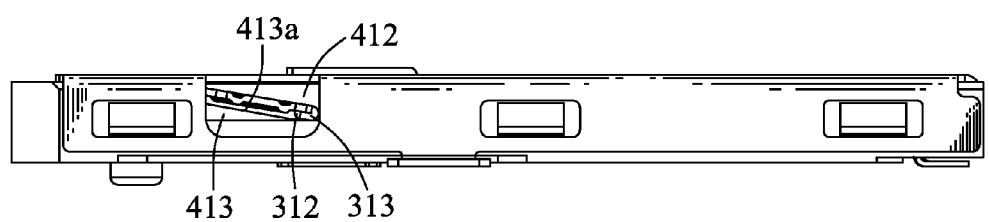
FIG. 5 is a lateral view showing the card connector of FIG. 1 is not in use.
Figure 6:
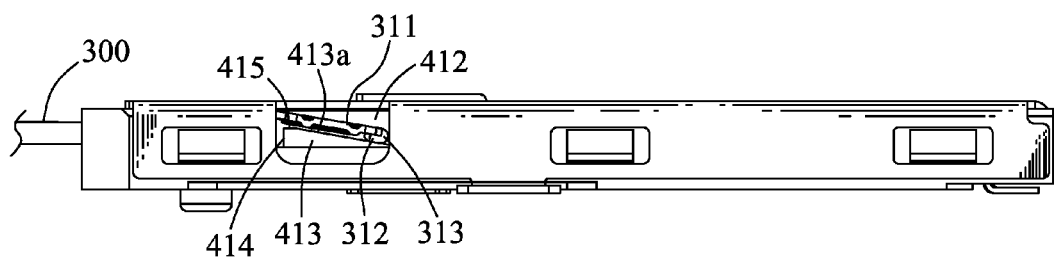
FIG. 6 is a lateral view showing the card is being inserted into the card connector of FIG. 1.

Referring to FIG. 2, FIG. 4 and FIG. 5, rear ends of the elastic slice 311 and the sliding block 312 are connected by a resisting portion 313 which has a cambered cross section for guiding the elastic slice 311 to slip down and up through the joining of the slope 413a and the blocking face 414 of the blocking block 413. The resisting portion 313 resists against the blocking face 414 of the blocking block 413 after the card 300 is inserted in place in the card connector 100 (shown in FIG. 4). In this embodiment, the cross section of the resisting portion 313 is substantially of semi-circular shape. A rear end of the slope 413a of the blocking block 413 is connected to the bottom sidewall of the sliding fillister 412 and spaced from a rear sidewall of the sliding fillister 412. The resisting portion 313 and the sliding block 312 are against the bottom sidewall of the sliding fillister 412 between the blocking block 413 and the rear sidewall of the sliding fillister 412 when there is no card in the card connector 100 (shown in FIG. 5), and are against the bottom sidewall of the sliding fillister 412 in front of the blocking block 413 when the card 300 is inserted in place in the card connector 100 (shown in FIG. 4).

Referring to FIG. 1 and FIG. 2, the top plate 31 of the cover 30 defines a blocking plate 316 located over the free end of the elastic slice 311 for preventing the elastic slice 311 from being excessively pushed upward by the external force. In this embodiment, the blocking plate 316 is formed by being die-cut off from one side of the top plate 31 of the cover 30 behind the elastic slice 311 and then being bent forward against a top of the top plate 31 to stretch over the free end of the elastic slice 311.

Figure 3:
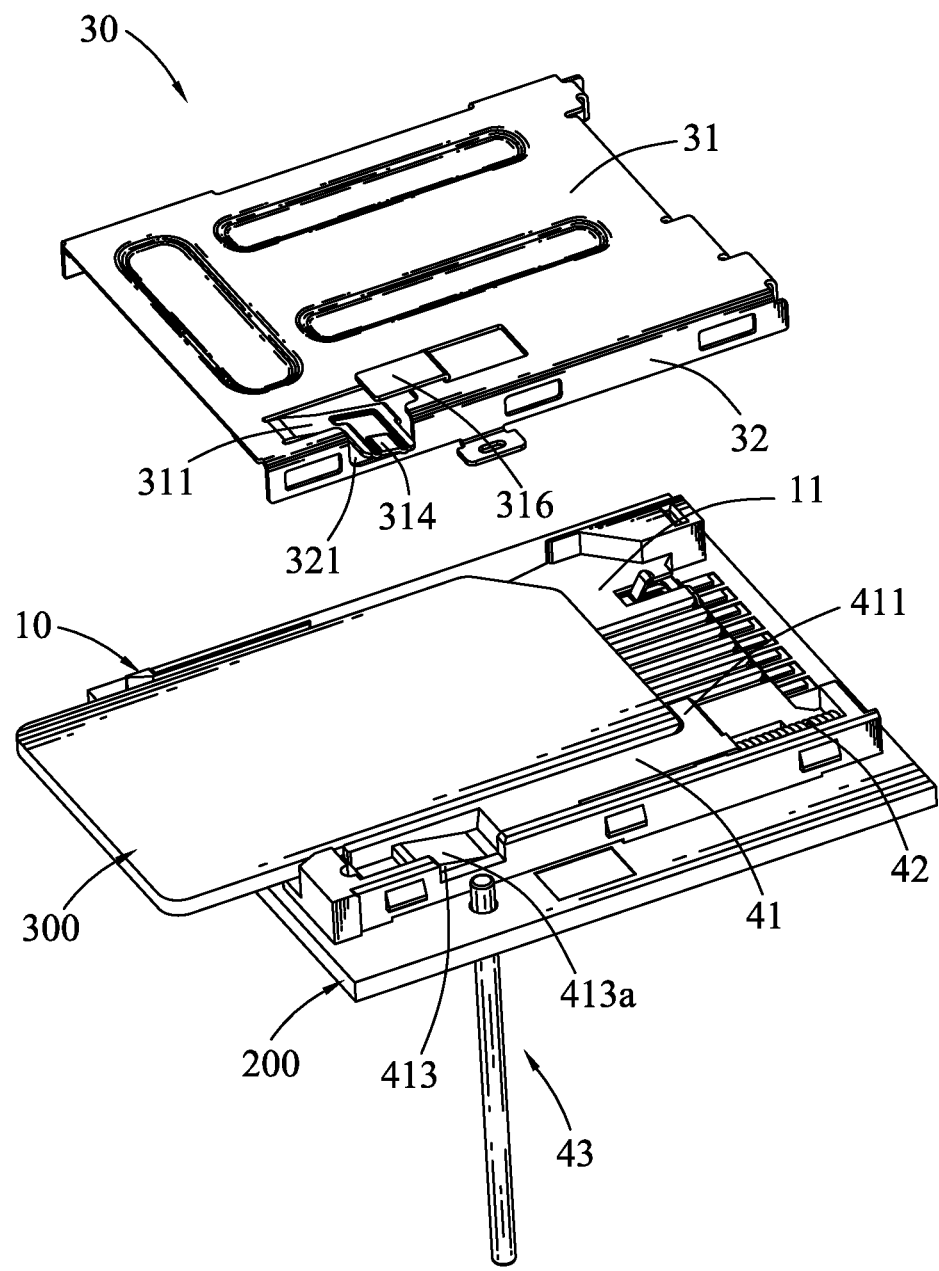
FIG. 3 is a partially exploded view showing that a card is inserted in the card connector mounted on the circuit board of FIG. 1.

Referring to FIG. 1, FIG. 2 and FIG. 3, the cover 30 further has a side plate 32 of which a portion adjacent to the elastic slice 311 is opened to form an opening 321. The insulating housing 10 has a side wall 14 beside the sliding recess 12 and the side plate 32 of the cover 30 is against an outside of the side wall 14. A top of the side wall 14 defines a gap 141 corresponding to the opening 321 of the side plate 32. The sliding fillister 412 of the sliding body 41 penetrates through a front and an outside of the sliding body 41 to communicate with the gap 141 of the insulating housing 10 and the opening 321 of the cover 30. A rear side edge of the elastic slice 311 further extends outward to form a pushing portion 314 passing through the gap 141 and the opening 321 to stretch outside. When the card 300 needs to be withdrawn from the card connector 100, the pushing portion 314 of the cover 30 is pushed upward by the external force to bring the elastic slice 311 away from the blocking face 414 of the blocking block 413. In this embodiment, the circuit board 200 defines a hole 201 opened under the pushing portion 314 of the cover 30, and the ejecting device further includes an ejecting pin 43 capable of passing through the hole 201 of the circuit board 200 to push the pushing portion 314 upward.

As described above, the elastic slice 311 of the cover 30 can resist against the blocking face 414 of the sliding body 41 in use, and set free the blocking block 413 when ejecting the card 300 out. So, in use, the sliding body 41 keeps being locked by the elastic slice 311 so that ensures a steady connection between the card 300 and the circuit board 200.

What is claimed is:

1. A card connector adapted for being mounted on a circuit board and receiving an external card, comprising:
   an insulating housing defining a receiving chamber for receiving the card therein, and a sliding recess adjacent to one side of the receiving chamber;
   a plurality of terminals disposed in the insulating housing for electrically connecting the card and the circuit board;
   an ejecting device disposed in the sliding recess of the insulating housing, the ejecting device including a sliding body and a spring restrained between a rear sidewall of the sliding recess and the sliding body, a pushing arm being formed at a rear end of the sliding body and protruding sideward into the receiving chamber, a top face of the sliding body defining a sliding fillister, a bottom sidewall of the sliding fillister protruding upward to form a blocking block spaced from a front sidewall of the sliding fillister and designating a front face thereof as a blocking face; and
   a cover coupled on the insulating housing, the cover having a top plate of which one side is die-cut to form an elastic slice inclined downward into the sliding fillister and elastically against a top of the blocking block,
   wherein in the process of the card being inserted into the receiving chamber of the card connector and pushing the sliding body to move rearward via resisting against the pushing arm, the elastic slice of the cover is elastically propped upward by the blocking block and slides forward with respect to the blocking block, when the card is inserted in place, the elastic slice slips off from the blocking block to resist against the blocking face, when the card needs to be withdrawn from the card connector, the elastic slice of the cover is driven upward by an external force to set free the blocking block and the spring so as to push the card out.

2. The card connector as claimed in claim 1, wherein the elastic slice of the cover extends rearward and is inclined downward in the process of extending rearward, a free end of the elastic slice protrudes downward to form a sliding block, the top of the blocking block is designed as a slope substantially parallel to the elastic slice, in the process of inserting the card into the receiving chamber, the sliding block relatively slides forward along the slope of the blocking block and the elastic slice is gradually propped upward by the slope.

3. The card connector as claimed in claim 2, wherein a transition surface is levelly connected between a front end of the slope and a top end of the blocking face of the blocking block for buffering the elastic slice before it slips off from the blocking block.

4. The card connector as claimed in claim 2, wherein rear ends of the elastic slice and the sliding block are connected by a resisting portion which has a cambered cross section for guiding the elastic slice to slip down and up through the joining of the slope and the blocking face of the blocking block, the resisting portion resists against the blocking face of the blocking block after the card is inserted in place in the card connector.

5. The card connector as claimed in claim 4, wherein the cross section of the resisting portion is substantially of semicircular shape.

6. The card connector as claimed in claim 4, wherein a rear end of the slope of the blocking block is connected to the bottom sidewall of the sliding fillister and spaced from a rear sidewall of the sliding fillister, the resisting portion and the sliding block are against the bottom sidewall of the sliding fillister between the blocking block and the rear sidewall of the sliding fillister when there is no card in the card connector, and are against the bottom sidewall of the sliding fillister in front of the blocking block when the card is inserted in place in the card connector.

7. The card connector as claimed in claim 2, wherein the top plate of the cover defines a blocking plate located over the free end of the elastic slice for preventing the elastic slice from being excessively pushed upward by the external force.

8. The card connector as claimed in claim 7, wherein the blocking plate is formed by being die-cut off from one side of the top plate of the cover behind the elastic slice and then being bent forward against a top of the top plate to stretch over the free end of the elastic slice.

9. The card connector as claimed in claim 2, wherein the cover further has a side plate of which a portion adjacent to the elastic slice is opened to form an opening, the insulating housing has a side wall beside the sliding recess and the side plate of the cover is against an outside of the side wall, a top of the side wall defines a gap corresponding to the opening of the side plate, the sliding fillister of the sliding body penetrates through an outside of the sliding body to communicate with the gap of the insulating housing and the opening of the cover, a rear side edge of the elastic slice further extends outward to form a pushing portion passing through the gap and the opening to stretch outside, when the card needs to be withdrawn from the card connector, the pushing portion of the cover is pushed upward by the external force to bring the elastic slice away from the blocking face of the blocking block.

10. The card connector as claimed in claim 9, wherein the circuit board defines a hole opened under the pushing portion of the cover, the ejecting device further includes an ejecting pin capable of passing through the hole of the circuit board to push the pushing portion upward.

11. The card connector as claimed in claim 2, wherein the sliding fillister penetrates through a front of the sliding body.

12. A card connector adapted for being mounted on a circuit board and receiving an external card, comprising:

an insulating housing defining a receiving chamber for receiving the card therein, and a sliding recess adjacent to one side of the receiving chamber, a top of a side wall of the insulating housing beside the sliding recess defining a gap;

a plurality of terminals disposed in the insulating housing for electrically connecting the card and the circuit board;

an ejecting device disposed in the sliding recess of the insulating housing, the ejecting device including a sliding body, a spring restrained between a rear sidewall of the sliding recess and the sliding body, and an ejecting pin, a top face of the sliding body defining a sliding fillister penetrating through an outside of the sliding body to communicate with the gap of the insulating housing, a bottom sidewall of the sliding fillister protruding upward to form a blocking block spaced from a front sidewall of the sliding fillister and designating a front face thereof as a blocking face; and a cover coupled on the insulating housing, the cover having a top plate of which one side is die-cut to form an elastic slice inclined downward into the sliding fillister and elastically against a top of the blocking block, and a side plate which is against an outside of the side wall, a portion of the side plate being opened to form an opening corresponding to and communicated with the gap of the insulating housing, a rear side edge of the elastic slice further extending outward to form a pushing portion passing through the gap and the opening to stretch outside, wherein the circuit board defines a hole opened under the pushing portion of the cover, in the process of the card being inserted into the receiving chamber of the card connector and pushing the sliding body to move rearward, the elastic slice of the cover is elastically propped upward by the blocking block and slides forward with respect to the blocking block, when the card is inserted in place, the elastic slice slips off from the blocking block to resist against the blocking face, when the card needs to be withdrawn from the card connector, the ejecting pin passes through the hole of the circuit board to push the pushing portion upward and further bring the elastic slice away from the blocking face of the blocking block so as to set free the blocking block and the spring to push the card out.

\* \* \* \* \*